UNITED STATES PATENT OFFICE.

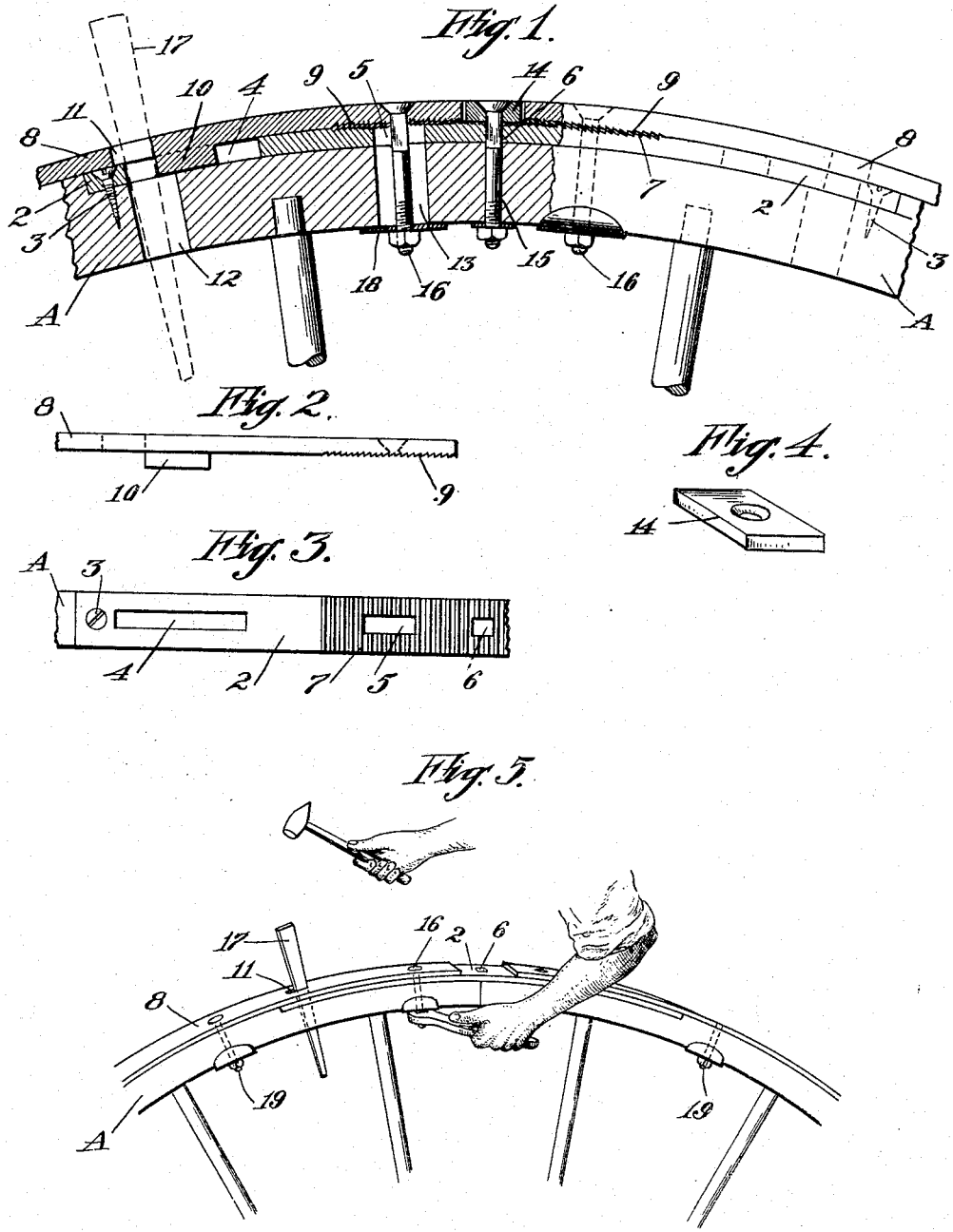

GUSTAVE A. KROHN, OF COARSEGOLD, CALIFORNIA.

VEHICLE-TIRE AND TIGHTENING MEANS THEREFOR.

939,037.      Specification of Letters Patent.      Patented Nov. 2, 1909.

Application filed March 27, 1909. Serial No. 486,146.

*To all whom it may concern:*

Be it known that I, GUSTAVE A. KROHN, citizen of the United States, residing at Coarsegold, in the county of Madera and State of California, have invented new and useful Improvements in Vehicle-Tires and Tightening Means Therefor, of which the following is a specification.

My invention relates to vehicle tires, such as are used on the wheels of wagons, carriages, and the like.

It particularly relates to that class of vehicle tires which are adapted to be applied to the felly of a wheel without welding or shrinking, and in which means of adjustment are provided.

It is the object of my invention to provide a vehicle tire which can be readily attached to and tightened on the wheel felly and which can be removed and replaced without difficulty.

It is a further object to provide a vehicle tire, with means by which it can be drawn up or tightened on the felly, as desired, without removal from the vehicle.

The chief advantages of my invention are that the lengthy and costly process of welding and shrinking the tire on the felly, is eliminated, and that the tire may be easily tightened upon the felly whenever it becomes loosened, as by the shrinking of the wooden structure of the wheel.

The invention consists of the parts and the construction and combination of parts or their equivalents, as hereinafter more fully described and claimed, having reference to the accompanying drawings, in which—

Figure 1 is an elevation, partly in section, of the upper portion of a vehicle wheel, showing my invention. Fig. 2 is a side view of the end portions of the tire. Fig. 3 is a plan view of the under plate. Fig. 4 is a detail of the tire fillet. Fig. 5 is a view showing the method of tightening the tire.

In the drawings, A is the felly or rim of a vehicle wheel of common construction.

A metallic plate 2 is set in flush with the periphery of the felly A, and securely fastened thereto by means of screws 3. Slots 4, 5 and 6 (Fig. 3) are provided in the plate 2, the purposes of which are later described. The central portion of the upper face of the plate 2 is provided with rasp teeth, or otherwise corrugated, as at 7.

The tire 8 consists of a metallic band bent to conform to the circumference of the felly, and of such length that the ends are not connected when placed on the wheel as shown in Figs. 1 and 5. The ends of the tire are toothed at 9, on the under side, in such a manner as to engage with the teeth 7, on the plate 2. Lugs 10 are formed on the under side, and near the end of the tire, and these lugs are adapted to engage with the slots 4 in the plate 2, and slots 11 are provided in the tire 8 at a point adjacent to, and just behind each of the lugs 10 for the insertion of a wedge 17 in tightening the tire, as will be shortly described. Slots 12—13 are formed in the felly so as to be registrable with the slots 4, 5, in the plate 2, and slots 11 in the tire. A block or fillet 14 is used to fill the space between the ends of the tire 8, and is held in place by means of the bolt 15. Bolts 16 are used to bind the tire to the felly A after the tire has been tightened by the key wedge 17.

In practice, the tire 8 is slipped upon the periphery of the felly 8, the lugs 10 engaging with the slots 4, and the teeth 9 meshing with the teeth 7 on the plate 2. One end of the tire 8 is rigidly secured to the felly by means of a bolt 16, as shown in dotted lines at the right of Fig. 1. The key 17 is then inserted through the slots 4, 11, 12, at the left and driven down between the back wall of slot 4 and lug 10 to draw the two ends of the tire together. The lugs 10 are necessary to form an opposed wall to the back of slot 4 so that the key will not twist when driven down. When the desired tension is obtained, the other bolt 16 is inserted in the tire 8 and slots 5—13 and the nut 17 tightened against the washer 18. This causes the teeth 9 on the tire 8 to become engaged with the toothed surface 7 on the plate 2, thus insuring no backward slip of the tire. Similar bolts 19 are used at intervals around the wheel to bind the tire more securely to the felly, each bolt passing through slots in the felly. When the tire is firmly fastened, the key 17 is removed. A block or fillet 14, of the right width, is then bolted to the felly, as shown in Fig. 1, the bolt 15 passing through the slot 6 in the plate 2.

It is obvious that when the tire becomes loosened on the felly from any cause, it may be quickly tightened by loosening the nuts on the bolts 16, then by use of the key 17 as before described, the proper degree of tension is obtained, whereupon the bolts 16 are retightened.

The teeth 7 and 9 have one side vertical so that when they inter-engage there is no chance of slipping.

Of course either end of the tire can be drawn up by leaving the end loose which is to be drawn, or both ends could be drawn up at one time by using two keys; but the manner of doing it as above shown is preferred.

Having thus described my invention, what I claim and desire to secure by Letters Patent is—

1. In a vehicle wheel, the combination with a felly, of a plate countersunk into the periphery thereof, said plate having slots adjacent to its ends, a tire fitting said felly and with the ends resting on said plate, said tire having slots registrable with said slots in said plate, means for engaging said slots to draw the ends of the tire together, and means for securing the tire to the wheel.

2. In a vehicle wheel, the combination of a felly having a plate countersunk in the periphery thereof, a fixed block on the plate and between the ends thereof, a tire having loose ends fitting the wheel with the ends on opposite sides of said block, means passing through the tire plate and felly to draw the ends of the tire toward each other to tighten the tire, and means for securing the tire to the wheel.

3. The combination in a vehicle wheel, of a felly having a countersunk plate, a tire unconnected at the ends and of less length than the circumference of the wheel, fitting the felly and with the ends resting on said plate, means passing through said tire, plate and felly to draw the ends of the tire together, the opposed surfaces of the plate and tire having inter-engaging corrugations, and means independent of said tightening means, and coöperating with said teeth to hold the ends of the tire.

4. The combination in a vehicle wheel, of a felly having a countersunk plate, a tire unconnected at the ends and of less length than the circumference of the wheel, fitting the felly and with the ends resting on said plate, means passing through the tire, plate and felly to draw the ends of the tire together, the opposed surfaces of the plate and tire having inter-engaging corrugations, means independent of said tightening means, coöperating with said teeth to hold the ends of the tire, and a block secured to the plate filling the space between the separated ends of the tire.

5. The combination in a vehicle wheel, of a felly having a plate countersunk in the periphery thereof, a tire fitting the felly, and of a less length than the circumference of the wheel, said plate having slots adjacent to its ends, and said tire having slots registering with said slots, and said tire also provided with lugs on its under side, and one of these lugs being arranged between one of said slots in the tire and the adjacent end of the tire, and said lugs fitting the slots in said plate, a tightening key to fit the slots in the tire and plate, and act behind a lug to tighten the tire, and means independent of said key for locking the tire to the plate and felly.

In testimony whereof I have hereunto set my hand in presence of two subscribing witnesses.

GUSTAVE A. KROHN.

Witnesses:
CHARLES PENFIELD,
CHARLES EDELMAN.